(12) United States Patent
Wu

(10) Patent No.: US 12,520,820 B1
(45) Date of Patent: Jan. 13, 2026

(54) PET FEEDER

(71) Applicant: Shenzhen Petemeng Creative Technology Co., Ltd., Shenzhen (CN)

(72) Inventor: Danyang Wu, Shenzhen (CN)

( * ) Notice: Subject to any disclaimer, the term of this patent is extended or adjusted under 35 U.S.C. 154(b) by 0 days.

(21) Appl. No.: 19/295,805

(22) Filed: Aug. 11, 2025

(30) Foreign Application Priority Data

Jul. 30, 2025 (CN) .......................... 202521598985.2

(51) Int. Cl.
*A01K 15/00* (2006.01)
*A01K 5/02* (2006.01)

(52) U.S. Cl.
CPC .......... *A01K 5/0291* (2013.01); *A01K 5/0225* (2013.01)

(58) Field of Classification Search
CPC ............................ A01K 5/0291; A01K 5/0225
USPC ..................................................... 119/51.01
See application file for complete search history.

(56) References Cited

U.S. PATENT DOCUMENTS

| | | | | |
|---|---|---|---|---|
| 3,762,373 A | * | 10/1973 | Grossman | A01K 5/0291 119/51.11 |
| 4,256,054 A | * | 3/1981 | Hitchcock | A01K 5/0291 119/51.5 |
| 2025/0331495 A1 | * | 10/2025 | Franklin | A01K 5/0283 |

\* cited by examiner

*Primary Examiner* — Richard T Price, Jr.
(74) *Attorney, Agent, or Firm* — Nitin Kaushik

(57) ABSTRACT

A pet feeder is provided, including a lid and an open/close assembly. Two transmission gears of the open/close assembly are meshed with two racks. A driving member drives the transmission gear to rotate, driving the rack to move so that the lid is away from/covering the feeding bin opening. The technical solution of the present disclosure aims to automatically open and close the lid for feeding, so as to avoid multiple pets from eating together.

6 Claims, 8 Drawing Sheets

PET FEEDER

CROSS-REFERENCE TO RELATED APPLICATIONS

Technical Field

The present disclosure relates to the field of pet breeding technology, and in particular to a pet feeder.

Background

A pet feeder is an automatic or timed feeding device designed to help pet owners ensure that their pets eat on time and in the right amount when they are not at home. An open or simple flip-top design is usually adopted in general pet feeders. This type of feeders has obvious disadvantages and cannot accurately control the feeding object, which can easily lead to food grabbing or mixed eating problems in multi-pet families; the lid needs to be opened and closed manually, which is inconvenient to use. It is easy to fail in lid-closing after long-term use, causing feed to get damp or spilled. These defects make it difficult for general feeders to meet the refined needs of modern pet keeping.

SUMMARY

The main purpose of the present disclosure is to provide a pet feeder, which aims to automatically open and close the lid for feeding and avoid multiple pets from eating together.

To achieve the above purpose, the pet feeder according to the present disclosure includes:

a mounting plate, where the mounting plate has a front and a back, a feeding bin is arranged at the bottom of the front of the mounting plate, a bin opening of the feeding bin is covered with a movable lid, a storage bin is arranged on the back of the mounting plate, the storage bin is connected to the feeding bin, and sliding grooves are opened through the surfaces of both sides of the mounting plate; and an open/close assembly, where the open/close assembly includes a driving member, at least two transmission gears, and two racks, the two racks are fitted on both sides of the back of the mounting plate, the rack is provided with a protrusion, the protrusion can extend from the sliding groove to the front of the mounting plate, and the movable lid is connected to the protrusion; the two transmission gears are fitted on the back of the mounting plate and meshed with the two racks respectively, and the driving member is driven and connected to the transmission gear; and the driving member drives the transmission gear to rotate, which can drive the rack to reciprocate up and down so that the movable lid is away from/covering the bin opening of the feeding bin.

In a possible embodiment, the movable lid is connected to a disassembling assembly on the side close to the mounting plate, and the disassembling assembly includes:

a box body, the movable lid being connected to the box body;

two shifting blocks, where the two shifting blocks are arranged in the box body at intervals and partially exposed on the outer surface of the box body;

two movable rods, where one end of each of the two movable rods is connected to the two shifting blocks, respectively, the other end extends out of the box body, the surface of the protrusion is provided with a fixing hole, and the movable rod extends into the fixing hole; and a spring, where the spring is located between the two shifting blocks and abuts against the two shifting blocks at both ends to provide thrust to make the movable rod press against the fixing hole, moving the two shifting blocks so that they are close to each other can make the movable rod move away from the fixing hole, and the movable lid can be removed from the feeding bin.

In a possible embodiment, an upper edge of the feeding bin is provided with a track groove, and a horizontal height of the track groove increases as it approaches the mounting plate; the movable lid is provided with guide posts at both ends of the side away from the mounting plate, and the guide posts are inserted into the track groove and can move along the track groove; when the rack drives the movable lid to move upward, the guide post slides upward along the track groove so that the movable lid is close to the mounting plate.

In a possible embodiment, a limiting plate is provided on the back of the mounting plate corresponding to the rack.

In a possible embodiment, a reinforcing frame is connected between a surface of the mounting plate and an outer edge of the feeding bin.

In a possible embodiment, a control assembly is further provided at an upper end of the mounting plate, and the driving member is electrically connected to the control assembly.

In the technical solution of the present disclosure, a driving member and a gear/rack transmission mechanism on the back of the mounting plate are adopted, and they work with the sliding grooves and limiting plates on both sides to ensure that the movable lid can move up and down smoothly and accurately, thereby realizing the opening and closing control of the feeding bin opening. The track groove and guide post structure enable the lid to automatically fit the mounting plate when it is opened and closed. The movable lid is designed to be easily disassembled for easy cleaning and maintenance. The reinforcing frame on the outer edge of the feeding bin enhances the overall structural strength. A user can control the opening and closing of the lid by means of the control assembly, effectively preventing multiple pets from eating together, achieving precise feeding, and solving the pain point that general feeders cannot provide targeted feeding.

BRIEF DESCRIPTION OF DRAWINGS

To more explicitly illustrate technical solutions in embodiments of the present disclosure or the existing art, drawings required for the description of the embodiments or the prior art are briefly introduced below. It is evident that the drawings in the following description are only some embodiments of the present disclosure, and persons of ordinary skill in the art can derive other drawings based on structures shown in these drawings without creative efforts.

Figure 1:
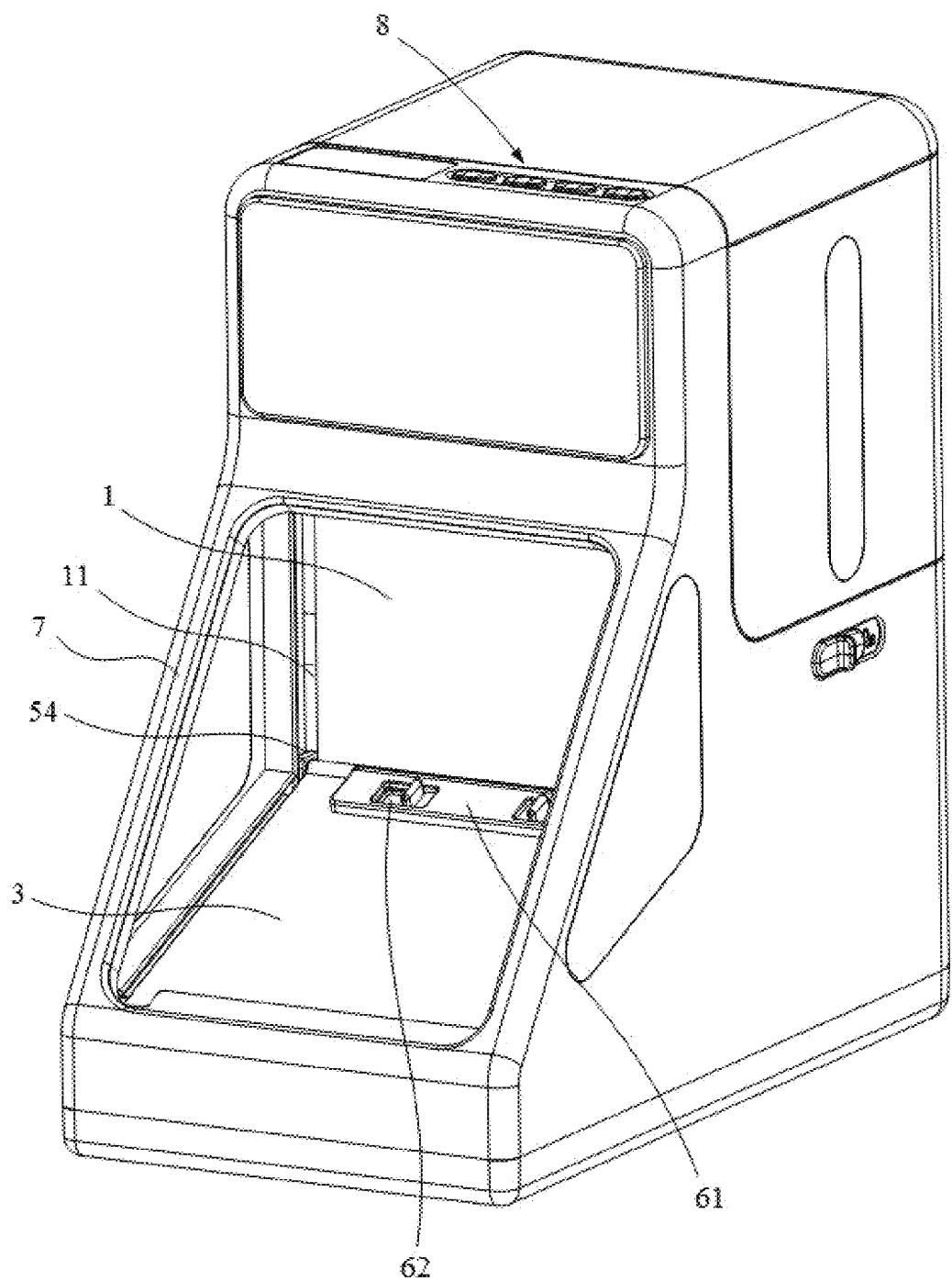
FIG. 1 is a schematic diagram of a movable lid closing structure of an embodiment of the pet feeder according to the present disclosure.

REFERENCE NUMERALS 1. mounting plate; 11. sliding groove; 12. limiting plate; 2. feeding bin; 21. track groove; 3. movable lid; 31. guide post; 4. storage bin; 51. driving member; 52. transmission gear; 53. rack; 54. protrusion; 55. fixing hole; 61. box body; 62. shifting block; 63. movable rod; 64. spring; 7. reinforcing frame; 8. control assembly.

The purpose realization, functional features, and advantages of the present disclosure will be further described with reference to embodiments and drawings.

DETAILED DESCRIPTION OF THE EMBODIMENTS

In order to make the purpose, technical solution, and advantages of the present application clearer, the present application is further described in detail below based on the drawings and embodiments. It should be understood that the preferred embodiments described herein are only to explain the present application and are not intended to limit the present application.

Referring to FIGS. 1 to 4, the present disclosure provides a pet feeder, including a mounting plate 1 and an open/close assembly. The mounting plate 1 has a front and a back, a feeding bin 2 is arranged at the bottom of the front of the mounting plate 1, a bin opening of the feeding bin 2 is covered with a movable lid 3, a storage bin 4 is arranged on the back of the mounting plate 1, the storage bin 4 is connected to the feeding bin 2, and sliding grooves 11 are opened through the surfaces of both sides of the mounting plate 1. The open/close assembly includes a driving member 51, at least two transmission gears 52, and two racks 53, the two racks 53 are fitted on both sides of the back of the mounting plate 1, the rack 53 is provided with a protrusion 54, the protrusion 54 can extend from the sliding groove 11 to the front of the mounting plate 1, and the movable lid 3 is connected to the protrusion 54; the two transmission gears 52 are fitted on the back of the mounting plate 1 and meshed with the two racks 53 respectively, and the driving member 51 is driven and connected to the transmission gear 52. The driving member 51 drives the transmission gear 52 to rotate, the rack 53 can be driven to reciprocate up and down so that the movable lid 3 is away from/covers the bin opening of the feeding bin 2.

It can be understood that the main function of the present application is to achieve targeted feeding and prevent different pets from eating together. The mounting plate 1 is the core supporting component of the feeder, which is divided into a front and a back. A feeding bin 2, i.e. a pet eating area, is provided at the bottom of the front, and the bin opening is equipped with a movable lid 3; a storage bin 4 is provided on the back to store feed, which is connected to the feeding bin 2 so that the feed can flow into the feeding bin 2; sliding grooves 11 are provided on both sides of the mounting plate 1, which are long strip holes running through the front and the back.

The open/close assembly is the core mechanical part, and its driving member 51 is configured to provide power; at least two transmission gears 52 are provided, which are driven to rotate by the driving member 51; there are two racks 53, which fit the back of the mounting plate 1, and each rack 53 has a protrusion 54 extending through the sliding groove 11 to the front and connected to the movable lid 3.

The working principle of the present application is as follows: the driving member 51 starts to drive the transmission gear 52 to rotate, the meshing rack 53 moves up and down, and the protrusion 54 of the rack 53 drives the movable lid 3 to rise and fall. When the rack 53 moves up, the movable lid 3 opens the feeding bin 2 so that the pet can eat; when the rack 53 moves down, the movable lid 3 closes and covers the bin opening.

When a specific pet needs to eat, the driving member 51 opens the movable lid 3, and other pets cannot touch the feed because the bin opening will be closed in time after the specific pet finishes eating. The storage bin 4 is dedicated to storing a pet feed, and by controlling the opening and closing of the movable lid 3, it is ensured that only the target pet can eat the corresponding feed. It is suitable for families with many pets to prevent pets from accidentally eating other types of feed. In this example, the pet chip can identify induction to trigger the driving member 51 to achieve intelligent automatic management.

Figure 6:
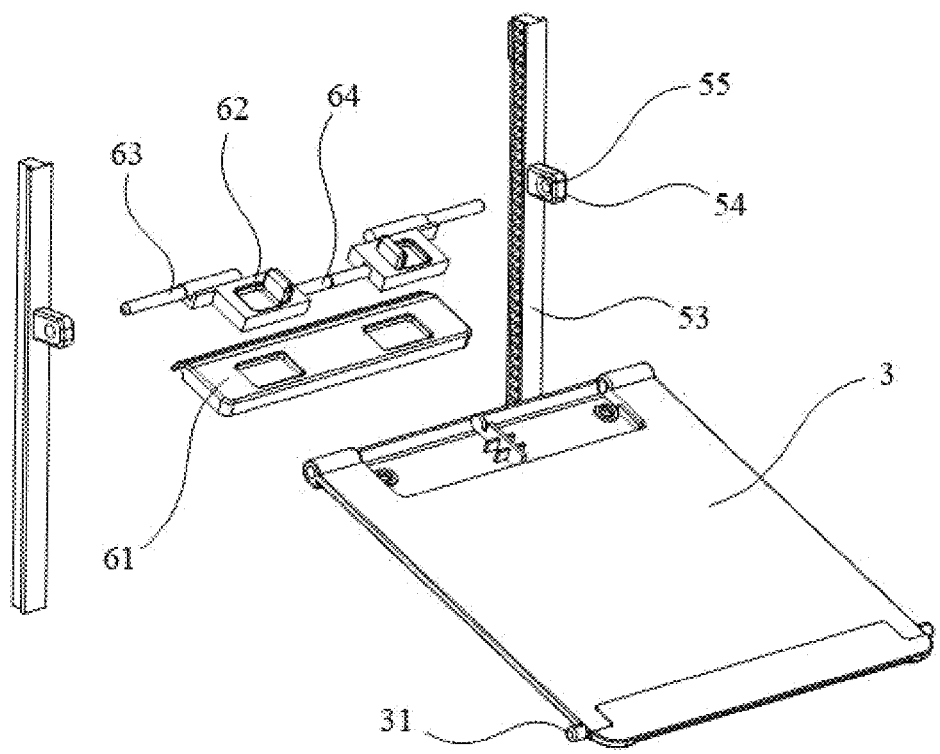
FIG. 6 is an exploded view of an embodiment of a movable lid according to the present disclosure.
Figure 7:
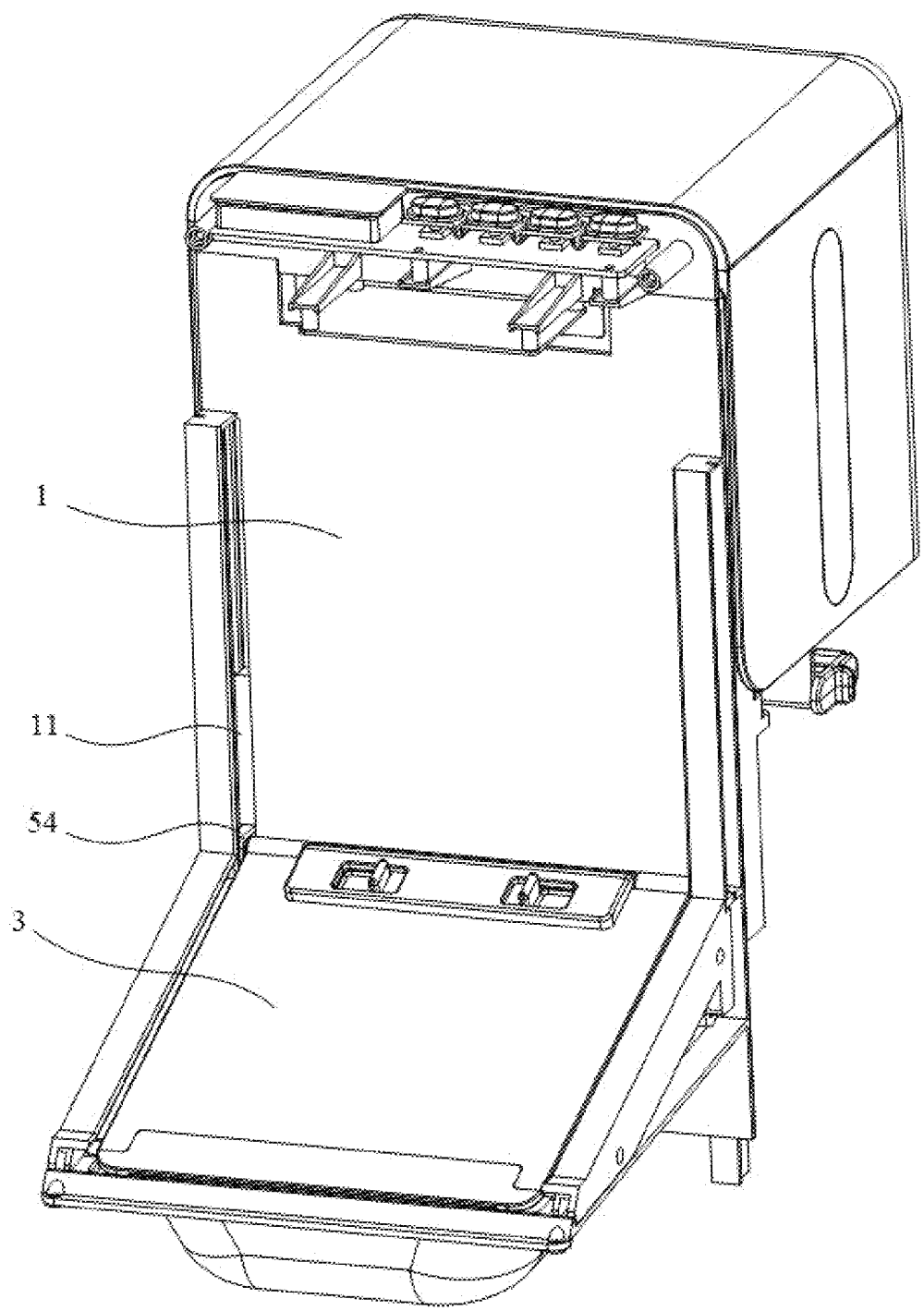
FIG. 7 is a schematic diagram of an internal structure of an embodiment of the pet feeder according to the present disclosure when the movable lid is closed.
Figure 8:
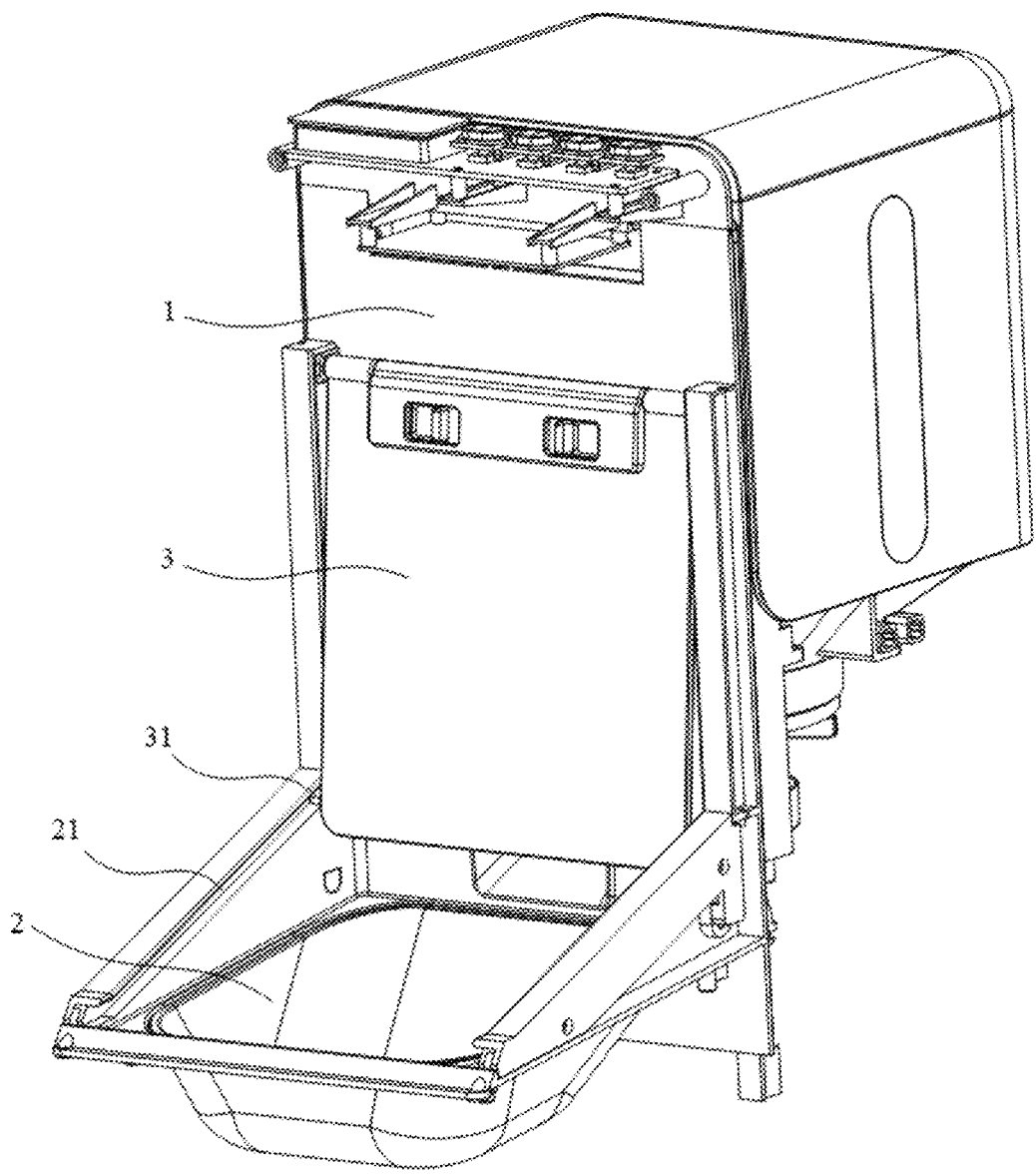
FIG. 8 is a schematic diagram of an internal structure of an embodiment of the pet feeder according to the present disclosure when the movable lid is opened.

Referring to FIGS. 1 and 6, in an embodiment of the present disclosure, the movable lid 3 is connected to a disassembling assembly on the side close to the mounting plate 1, and the disassembling assembly includes a box body 61, two shifting blocks 62, two movable rods 63, and a spring 64. The movable lid 3 is connected to the box body 61; the two shifting blocks 62 are arranged at intervals in the box body 61 and partially exposed on the outer surface of the box body 61; one end of each of the two movable rods 63 is connected to the two shifting blocks 62, respectively, the other end extends out of the box body 61, the surface of the protrusion 54 is provided with a fixing hole 55, and the movable rod 63 extends into the fixing hole 55. The spring 64 is located between the two shifting blocks 62 and abuts against the two shifting blocks 62 at both ends to provide thrust to make the movable rod 63 press against the fixing hole 55, moving the two shifting blocks 62 so that they are close to each other can make the movable rod 63 move away from the fixing hole 55, and the movable lid 3 can be removed from the feeding bin 2.

It can be understood that the box body 61 is fixed to the side of the movable lid 3 close to the mounting plate 1, and other components are accommodated inside. Two shifting blocks 62 are arranged in the box body 61 at intervals, and partially exposed on the outer surface of the box body 61 for easy finger movement. Each shifting block 62 is connected to a movable rod 63. One end of the movable rod 63 is connected to the shifting block 62, and the other end extends out of the box body 61 and is inserted into the fixing hole 55 of the protrusion 54 to fix the movable lid 3 and the rack 53. The spring 64 is located between the two shifting blocks 62, providing an outward thrust so that the movable rod 63 is always tightly pressed against the fixing hole 55.

The default state of the movable lid 3 is that it is locked, the spring 64 opens the two shifting blocks 62, the movable rod 63 is pushed toward the fixing hole 55, and the movable lid 3 is fixed to the protrusion 54 of the rack 53 and cannot be separated; during the disassembly operation, the two shifting blocks 62 are pressed at the same time to overcome the force of the spring 64, so that the shifting blocks 62 approach each other, the movable rod 63 withdraws from the fixing hole 55, and the movable lid 3 can be separated from the protrusion 54 to complete the disassembly. Through the above arrangement, it can be disassembled by pressing the shifting block 62, which is convenient for cleaning or replacing the movable lid 3, ensuring that the movable lid 3 is stable during daily use to avoid accidental loosening caused by pets touching it.

Figure 2:
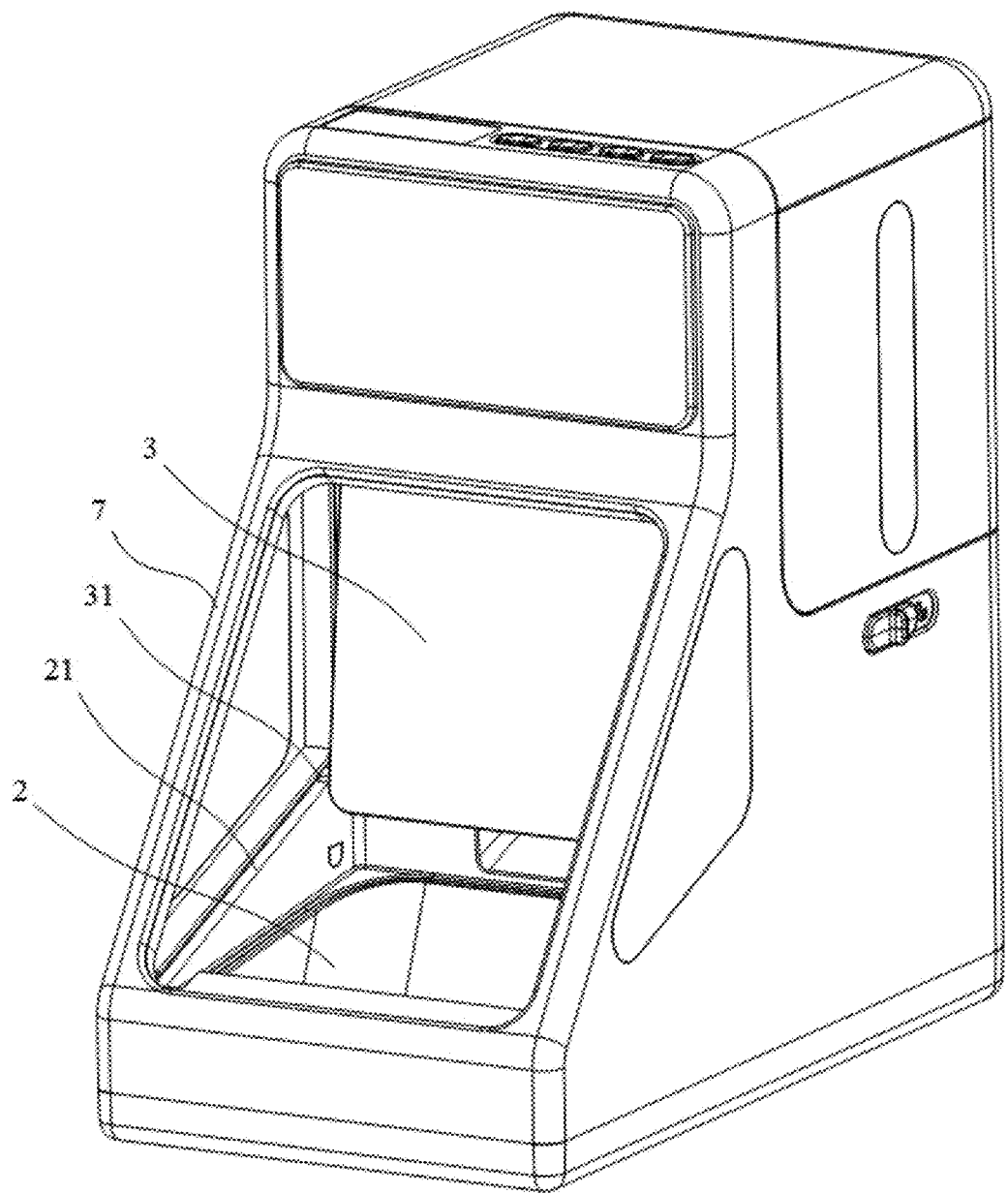
FIG. 2 is a schematic diagram of a movable lid opening structure of an embodiment of the pet feeder according to the present disclosure.

Referring to FIG. 2, in an embodiment of the present disclosure, an upper edge of the feeding bin 2 is provided with a track groove 21, and a horizontal height of the track groove 21 increases as it approaches the mounting plate 1; the movable lid 3 is provided with guide posts 31 at both ends of the side away from the mounting plate 1, and the guide posts 31 are inserted into the track groove 21 and can move along the track groove 21; when the rack 53 drives the movable lid 3 to move upward, the guide post 31 slides upward along the track groove 21 so that the movable lid 3 is close to the mounting plate 1.

It can be understood that the track groove 21 is located at the edges of both sides of the opening of the feeding bin 2, and has a horizontal height gradient, with the side close to the mounting plate 1 being higher and the side away from it being lower, providing a sliding track for the guide post 31 of the movable lid 3 and controlling the movement trajectory of the movable lid 3. The guide post 31 is located at both ends of the side of the movable lid 3 away from the mounting plate 1, that is, on the side opposite to the protrusion 54 of the connecting rack 53. It is inserted into the track groove 21 and can slide along the groove.

During the lid-opening process, the rack 53 drives the movable lid 3 to rise as a whole through the protrusion 54, and the guide post 31 slides along the track groove 21. Since the side of the track groove 21 close to the mounting plate 1 is higher, the movable lid 3 will gradually approach the mounting plate 1, so that the movable lid 3 remains nearly parallel to the mounting plate 1 when opened, avoiding the front end from bulging or shaking. During the lid-closing process, the guide post 31 slides in the opposite direction along the track groove 21, and the movable lid 3 smoothly covers the feeding bin 2 opening.

The inclined design of the track groove 21 converts the vertical lifting force of the movable lid 3 into an inclined force, avoiding the skew caused by uneven force on the movable lid 3 when it is driven only by the rack 53. When the movable lid 3 is closed, the guide post 31 slides to the low position of the track groove 21 to ensure that the lid body completely covers the bin opening to prevent feed from spilling or getting wet.

Figure 5:
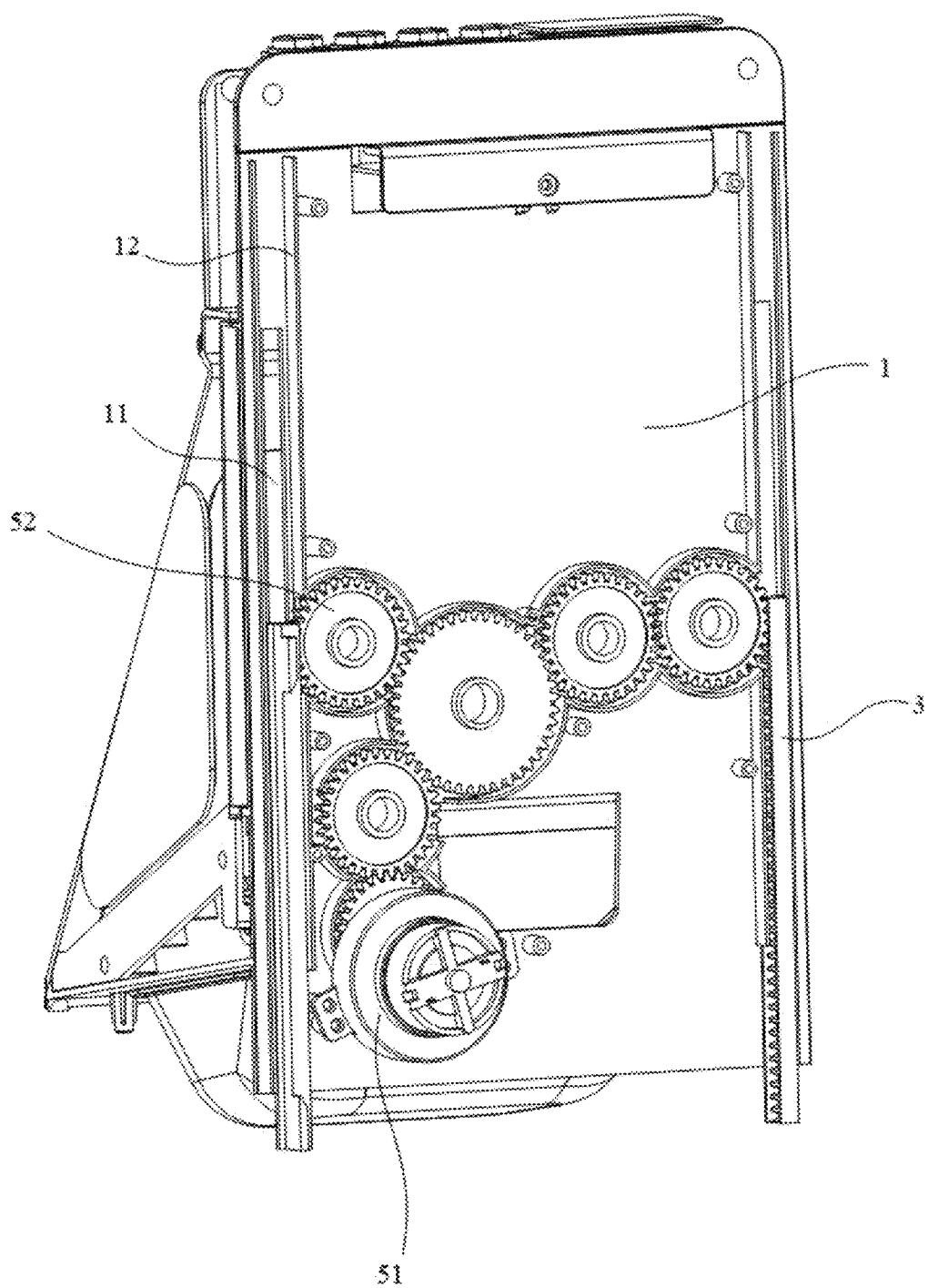
FIG. 5 is a schematic diagram of a back structure of an embodiment of a mounting plate according to the present disclosure.

Referring to FIG. 5, in an embodiment of the present disclosure, a limiting plate 12 is provided on the back of the mounting plate 1 corresponding to the rack 53.

It can be understood that the limiting plate 12 is fixed to the back of the mounting plate 1, and the corresponding rack 53 is arranged on both sides thereof, parallel to the direction of the rack 53, limiting the left and right shaking of the rack 53, avoiding the meshing misalignment between the gear and the rack 53, and ensuring that the rack 53 moves up and down strictly in the vertical direction without tilting forward and backward.

Figure 3:
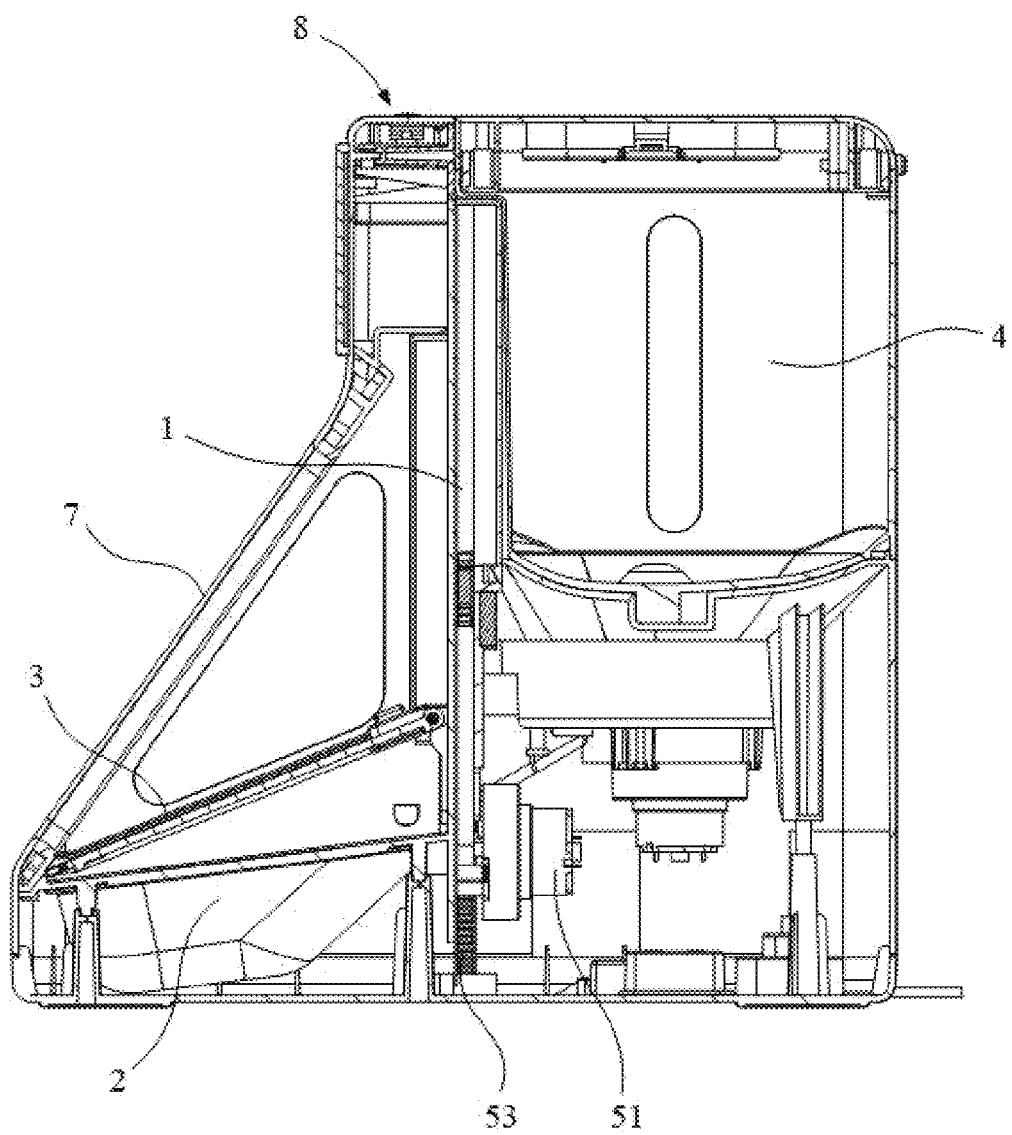
FIG. 3 is a cross-sectional view of an embodiment of the pet feeder according to the present disclosure.
Figure 4:
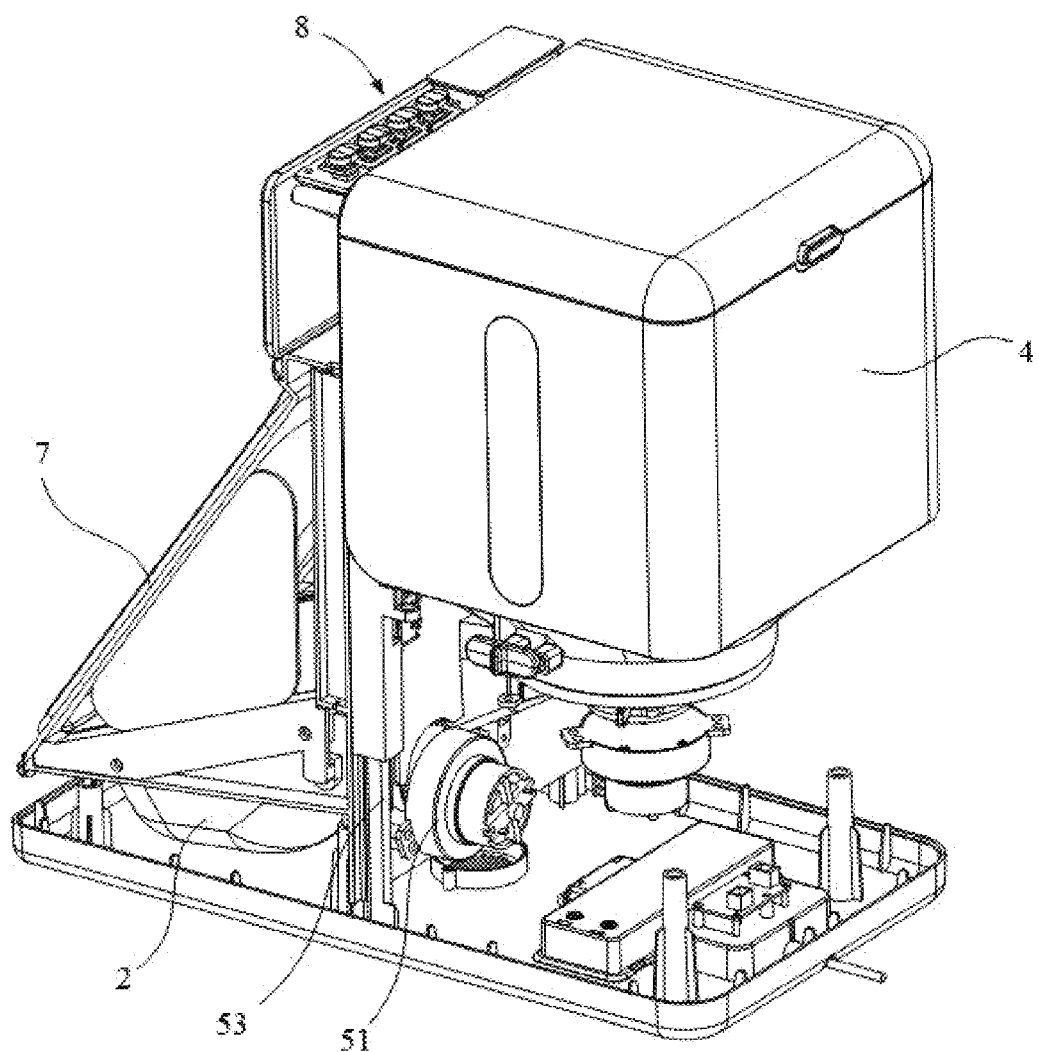
FIG. 4 is a schematic diagram of an internal structure of an embodiment of the pet feeder according to the present disclosure.

Referring to FIGS. 1 to 3, in an embodiment of the present disclosure, a reinforcing frame 7 is connected between a surface of the mounting plate 1 and an outer edge of the feeding bin 2.

It can be understood that the reinforcing frame 7 is located between the surface of the mounting plate 1 and the outer edge of the feeding bin 2 to form a supporting connection structure, which is used to increase the connection rigidity between the feeding bin 2 and the mounting plate 1, so as to prevent the feeding bin 2 from shaking or being damaged when it is subjected to force such as pets picking food; the impact force on the feeding bin 2 is transmitted to the mounting plate 1 through the frame to reduce the risk of local deformation. The reinforcing frame 7 can be integrally injection molded/cast with the mounting plate 1 or the feeding bin 2 to form an integral structure; the metal/plastic frame can also be fixed between the mounting plate 1 and the feeding bin 2 by screws or buckles, which is not further limited here.

Referring to FIGS. 1 to 4, in an embodiment of the present disclosure, a control assembly 8 is further provided at an upper end of the mounting plate 1, and the driving member 51 is electrically connected to the control assembly 8.

It can be understood that the control assembly 8 is mounted on the upper end of the mounting plate 1 for receiving instructions to trigger the driving member 51 through a key, wireless signal or sensor.

The control method can be remote control, which controls the opening and closing of the feeder through a handheld remote control or mobile phone App, suitable for timed feeding or temporary extra meals; or smart home linkage, connected to smart home systems such as Tmall Genie and Google Home, voice or scene linkage control. In this example, it is an induction start. The pet wears a detection chip. The control assembly 8 opens the lid when detecting that the pet approaches and closes it after leaving to avoid exposing the feed for too long. Through the above settings, the problem of grabbing food or overeating in a family with multiple pets can be avoided, and the owner can still automatically feed the pet when he is on a business trip or traveling.

In the technical solution of the present disclosure, a driving member 51 and a gear/rack 53 transmission mechanism on the back of the mounting plate 1 are adopted, and they work with the sliding grooves 11 and limiting plates 12 on both sides to ensure that the movable lid 3 can move up and down smoothly and accurately, thereby realizing the opening and closing control of the feeding bin 2 opening. The track groove 21 and guide post 31 structure enable the lid to automatically fit the mounting plate 1 when it is opened and closed. The movable lid 3 is designed to be easily disassembled for easy cleaning and maintenance. The reinforcing frame 7 on the outer edge of the feeding bin 2 enhances the overall structural strength. A user can control the opening and closing of the lid by means of the control assembly 8, effectively preventing multiple pets from eating together, achieving precise feeding, and solving the pain point that general feeders cannot provide targeted feeding.

The same or similar reference numerals in the drawings of this embodiment correspond to the same or similar components. In the description of the present application, it should be understood that if the terms "upper", "lower", "left", "right", etc. indicate an orientation or positional relationship based on the orientation or positional relationship shown in the accompanying drawings, they are only for the convenience of describing the present application and simplifying the description, and do not indicate or imply that the device or element referred to must have a specific orientation, be constructed and operated in a specific orientation. Therefore, the terms used to describe the positional relationship in the accompanying drawings are only for exemplary illustration. It cannot be understood as a limitation of the present application. For ordinary technicians in this field, the specific meaning of the above terms can be understood according to the specific situation.

The above is only a preferred embodiment of the present application and is not intended to limit the present application. Any modifications, equivalent substitutions and improvements made within the spirit and principles of the present application shall be included in the scope of protection of the present application.

What is claimed is:

1. A pet feeder, comprising:
a mounting plate, where the mounting plate has a front and a back, a feeding bin is arranged at the bottom of the front of the mounting plate, a bin opening of the feeding bin is covered with a movable lid, a storage bin is arranged on the back of the mounting plate, the storage bin is connected to the feeding bin, and sliding grooves are opened through the surfaces of both sides of the mounting plate; and
an open/close assembly, where the open/close assembly includes a driving member, at least two transmission gears, and two racks, the two racks are fitted on both sides of the back of the mounting plate, the rack is provided with a protrusion, the protrusion can extend from the sliding groove to the front of the mounting plate, and the movable lid is connected to the protrusion; the two transmission gears are fitted on the back of the mounting plate and meshed with the two racks respectively, and the driving member is driven and connected to the transmission gear; and
the driving member drives the transmission gear to rotate, which can drive the rack to reciprocate up and down so that the movable lid is away from/covering the bin opening of the feeding bin.

2. The pet feeder according to claim 1, wherein the movable lid is connected to a disassembling assembly on the side close to the mounting plate, and the disassembling assembly includes:
a box body, the movable lid being connected to the box body;
two shifting blocks, where the two shifting blocks are arranged in the box body at intervals and partially exposed on the outer surface of the box body;
two movable rods, where one end of each of the two movable rods is connected to the two shifting blocks, respectively, the other end extends out of the box body, the surface of the protrusion is provided with a fixing hole, and the movable rod extends into the fixing hole; and
a spring, where the spring is located between the two shifting blocks and abuts against the two shifting blocks at both ends to provide thrust to make the movable rod press against the fixing hole, moving the two shifting blocks so that they are close to each other can make the movable rod move away from the fixing hole, and the movable lid can be removed from the feeding bin.

3. The pet feeder according to claim 2, wherein an upper edge of the feeding bin is provided with a track groove, and a horizontal height of the track groove increases as it approaches the mounting plate; the movable lid is provided with guide posts at both ends of the side away from the mounting plate, and the guide posts are inserted into the track groove and can move along the track groove; when the rack drives the movable lid to move upward, the guide post slides upward along the track groove so that the movable lid is close to the mounting plate.

4. The pet feeder according to claim 3, wherein a limiting plate is provided on the back of the mounting plate corresponding to the rack.

5. The pet feeder according to claim 4, wherein a reinforcing frame is connected between a surface of the mounting plate and an outer edge of the feeding bin.

6. The pet feeder according to claim 5, wherein a control assembly is further provided at an upper end of the mounting plate, and the driving member is electrically connected to the control assembly.

* * * * *